United States Patent [19]
Carpenter et al.

[11] Patent Number: 5,417,169
[45] Date of Patent: May 23, 1995

[54] APPARATUS FOR REMOVING VISCOUS MATERIAL FROM BARRELS

[75] Inventors: Keith H. Carpenter, Hilton Head, S.C.; Mark N. Looman, Ft. Wayne, Ind.

[73] Assignee: Systech Environmental Corporation, Xenia, Ohio

[21] Appl. No.: 107,933

[22] Filed: Aug. 17, 1993

[51] Int. Cl.6 .............................................. F23G 5/02
[52] U.S. Cl. .................................. 110/222; 15/104.05
[58] Field of Search ............... 15/93.1, 104.04, 104.05, 15/104.03; 34/60, 85; 110/222

[56] References Cited

U.S. PATENT DOCUMENTS

| | | |
|---|---|---|
| 334,488 | 1/1886 | Taylor . |
| 502,414 | 8/1893 | Flower et al. . |
| 542,669 | 7/1895 | Winterbotham . |
| 999,208 | 8/1911 | Cluthe . |
| 1,145,927 | 7/1915 | Shorten . |
| 1,347,649 | 7/1920 | Mosher . |
| 2,115,439 | 4/1938 | Wolfner . |
| 2,558,983 | 7/1951 | Roberts . |
| 3,905,061 | 9/1975 | Cradeur ........................ 15/104.05 |
| 4,957,222 | 9/1990 | Rolfe . |
| 5,022,328 | 6/1991 | Robertson ......................... 110/222 |

OTHER PUBLICATIONS

Chambers Environmental Int'l, Muffin Monster Product Summary, Jan. 1990.

Primary Examiner—Willis R. Wolfe
Attorney, Agent, or Firm—Thompson, Hine And Flory

[57] ABSTRACT

An apparatus for removing viscous material from barrels includes a conventional drum dumper, an auger formed of a double helix of metal ribbon, a motor for rotating the auger, and a carriage assembly for supporting the motor and auger and advancing the auger into and out of an inverted barrel. As the auger is advanced into the open end of an inverted barrel, the motor rotates the auger to insert the double helix into the viscous material and urge the viscous material rearwardly out of the open barrel end. The carriage assembly includes a carriage which supports a central shaft of the auger and the auger motor, and four guide rails which constrain the movement of the carriage to rectilinear motion. The tolerances between the carriage assembly and rails are such that the auger can skew slightly relative to the direction of travel so that the auger can negotiate around a side bung formed on the barrel, and yet provide a relatively close tolerance between the outer periphery of the auger and the inner surface of the barrel. Also, the leading edge of the auger includes cross bars provided with adjustable and/or removable teeth for digging into the viscous material, and the shaft includes a steam supply system for projecting jets of steam and/or other fluids from the sides and ends of the auger to loosen the viscous material. Limits of forward and rearward travel of the frame are controlled by a programmable logic controller.

16 Claims, 3 Drawing Sheets

APPARATUS FOR REMOVING VISCOUS MATERIAL FROM BARRELS

BACKGROUND OF THE INVENTION

The present invention relates to devices for emptying containers and, more particularly, to devices for emptying viscous material from barrels, such as 55 gallon drums.

Much toxic and hazardous material is disposed of by combustion in incinerators, rotary reactors and cement kilns wherein the material is subjected to high temperatures, typically in the range of 1,500 C., so that the organic constituents of the material are burned and broken down into harmless components. However, much of such toxic and hazardous material is delivered to the disposal site in 55 gallon drums or the like and is in a highly viscous form, having a consistency which approaches that of putty or clay. Accordingly, it is necessary to remove such material from the drums in which it was transported and treat the material so that it has a consistency appropriate for substantially complete combustion in a reactor. Furthermore, it is necessary to remove as much of the hazardous or toxic material from such drums as possible in order to reduce the subsequent labor-intensive steps of cleaning the drums for reuse and shipment to the source of the material.

While there are presently no devices which are specially designed for removing substantially the entire contents of a drum of viscous, toxic or hazardous material, devices for emptying the contents of drums are known. For example, Shorten U.S. Pat. No. 1,145,927 discloses a machine for emptying barrels which includes a double helix of blades mounted on a central shaft and having an outer diameter which approximates the inner diameter of the barrel to be emptied. The central shaft is splined and mounted on a fixed support structure. A fixed gear is mounted on the splined shaft and rotated by a spur gear to provide rotational motion, and a lever is provided to advance and retract the central shaft.

Similarly, in Mosher U.S. Pat. No. 1,347,649, a barrel emptying device uses stationary gears to provide rotation for an auger and the central shaft of the auger is threaded and engages a stationary nut to provide advancing motion. Pulleys are provided to retract the auger from the barrel.

While such antiquated devices incorporate reciprocating augers for emptying barrels, their power sources are labor intensive and there are no provisions for negotiating their augers about a sideward projection in the barrel being emptied, such as a side bung. Accordingly, there is a need for a system for emptying a barrel of highly viscous, toxic or hazardous material which is more automated and more reliable than such prior art devices.

SUMMARY OF THE INVENTION

The present invention is an apparatus for removing viscous material from barrels which includes a device for inverting the barrel such that the open end of the barrel is pointing generally downwardly, an auger shaped to fit within the open end of the barrel and which approximates the inner diameter of the barrel, a motor for rotating the auger, and a carriage assembly system for mounting the auger and motor and advancing the auger into and out of the barrel.

In a preferred embodiment, the auger includes a pair of ribbon members bent to form a double helix and mounted on a central shaft, the end of the shaft and ribbons being connected by a cross bar having projecting teeth for digging into the viscous material. Further, the carriage assembly system includes a carriage assembly having a forward bulkhead that includes a main bearing for supporting the central shaft and a rear wall which mounts the motor for rotating the auger. The carriage assembly slides along four guide rails which constrain movement of the carriage assembly to rectilinear motion. The system includes double-acting cylinders mounted on the guide rails advance and retract the carriage assembly to insert the rotating auger into an inverted barrel or retract the auger from the barrel.

Also in the preferred embodiment, the auger includes a steam supply system which conveys steam or other solvent through a passageway in the central shaft to jets formed on the cross bar to loosen the material as the auger is advanced into the barrel. The preferred embodiment also includes a programmable logic controller which actuates the motor for rotating the auger, and actuates the cylinder motors to advance and retract the carriage assembly. Limit switches mounted on the guide rails determine the limits of travel in a forward and rearward direction.

The carriage assembly preferably is dimensioned such that there are tolerances between the carriage assembly and guide rails which enable the auger to skew slightly as it enters the barrel. This enables the auger to negotiate around side obstructions, such as a side bung in a barrel, without damaging the auger and enabling the auger to pass by the projection and yet remove substantially the entire contents of the barrel.

Accordingly, it is an object of the present invention to provide an apparatus for emptying a barrel of viscous material in which manual activity is reduced to a minimum to prevent contamination with hazardous or toxic material; an apparatus which is sufficiently rugged to remove putty or clay-like contents from an inverted barrel; an apparatus which can be cleaned relatively easily to prevent build-up of corrosive material; an apparatus in which viscous contents are removed by a combination of auger action and steam or other solvent application; and an apparatus which is relatively inexpensive to fabricate and maintain, and an apparatus which minimizes the resistance to material flowing out of the barrel.

Other objects and advantages of the present invention will be apparent from the following description, the accompanying drawing and the appended claims.

DETAILED DESCRIPTION

Figure 1:
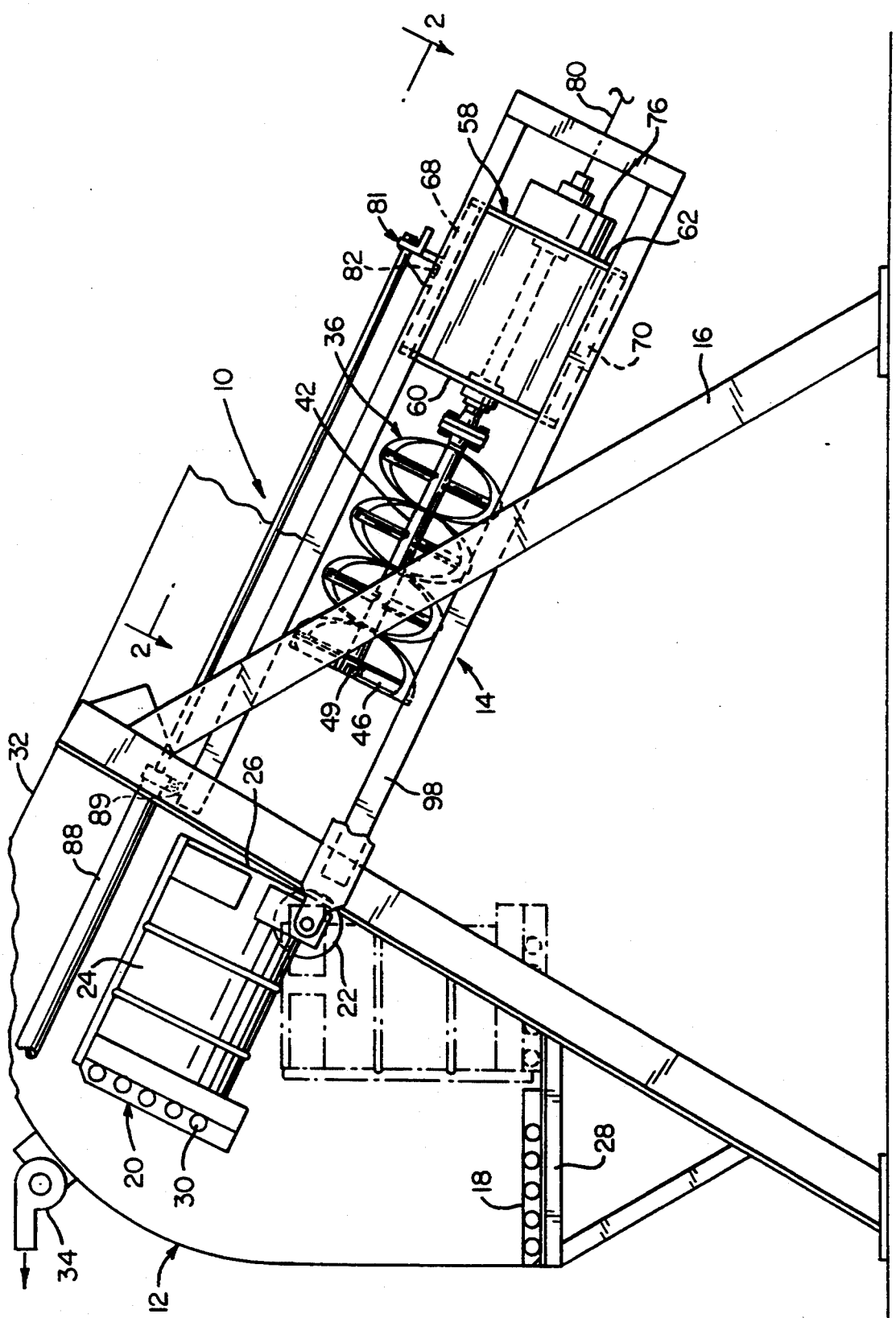
FIG. 1 is a somewhat schematic side elevation of a preferred embodiment of the apparatus of the present invention.

As shown in FIG. 1, the apparatus for removing viscous material from barrels, generally designated 10 and hereinafter referred to as the autoauger, includes a drum dumper, generally designated 12, an auger assembly generally designated 14, and a support A-frame 16. The dumper 12 includes an input conveyor 18, a barrel platform 20 and a hydraulically-driven rotary actuator 22 for inverting the platform from an upright position (shown in phantom in FIG. 1) to a substantially inverted position (shown solid in FIG. 1) in which a barrel 24 is substantially inverted such that its open end 26 is oriented substantially downwardly.

The input conveyor 18 is mounted on a support platform 28 and the barrel platform 20 includes a conveyor 30 for receiving barrels 24 from the conveyor 18. In the preferred embodiment, the dumper 12 is enclosed in a housing 32 which shields the environment from fumes and contamination and includes an exhaust system 34 which conveys such fumes to a reactor (see FIG. 4) for combustion. Accordingly, the space within the housing 32 is maintained at a negative pressure.

Figure 2:
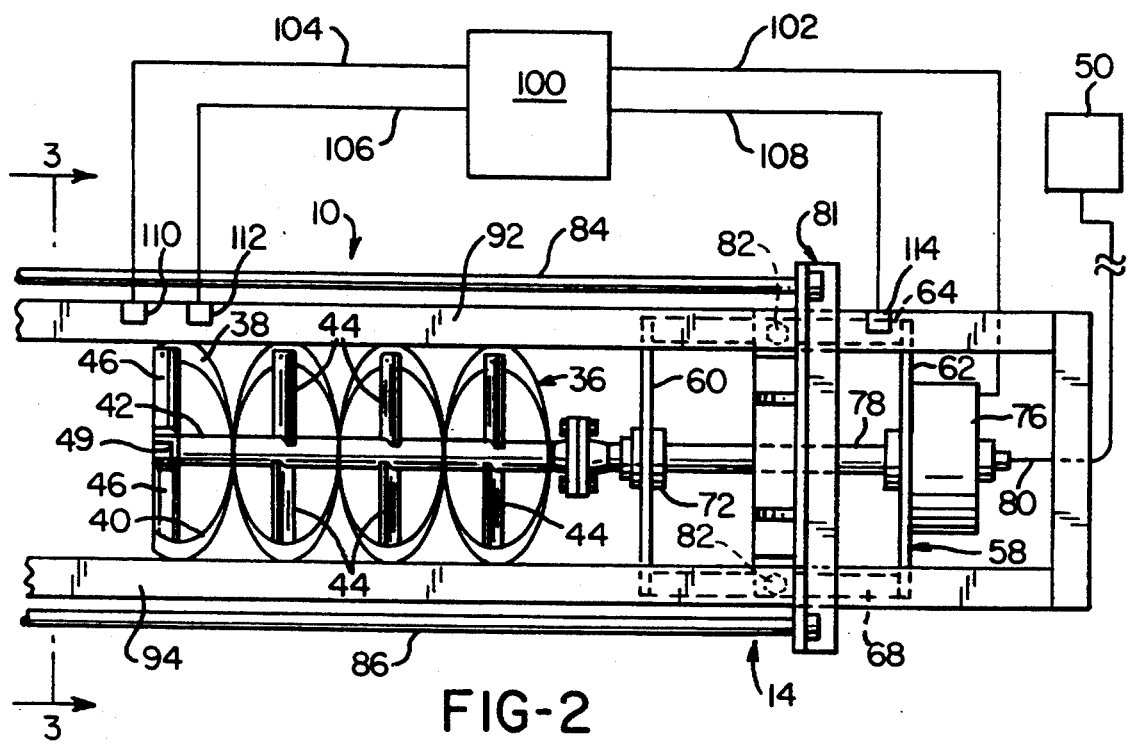
FIG. 2 is a detail taken at line 2—2 of FIG. 1.
Figure 3:
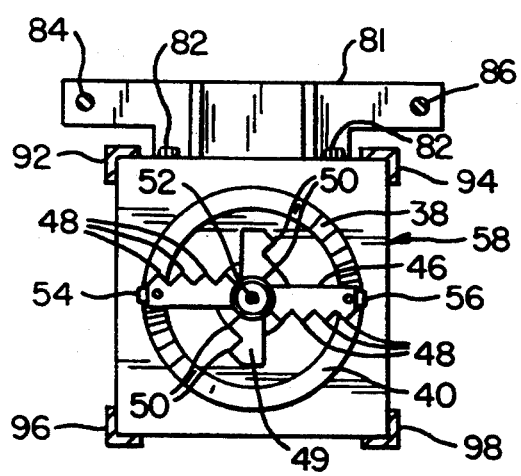
FIG. 3 is a detail taken at line 3—3 of FIG. 2.

As shown in FIGS. 1, 2, and 3, the auger assembly 14 includes an auger 36 which includes ribbons 38, 40 of metal bent in a helical shape and intertwined to form a double helix. The ribbons 38, 40 are mounted on a central shaft 42 which includes sidewardly extending struts 44 to support the ribbons. The ends of the ribbons 38, 40 are joined to the shaft 42 by a cross bar 46 having a plurality of projecting teeth 48, which preferably are adjustable and removable, for digging into the contents of the barrel 24 (see FIG. 1). A second cross bar 49 having a plurality of adjustable and removable teeth 50 for digging into the contents of the barrel 24 extends from the shaft 42 perpendicularly to cross bar 46 (see FIG. 3). The second cross bar 49 is shorter in length than cross bar 46 and is not attached to the ribbons 38, 40.

The central shaft 42 is hollow and conveys steam from a source 51 (see FIG. 2) to discharge at a central orifice 52 and side orifices 54, 56 formed on the cross bar 46. It should be noted that other fluids may be conveyed through the orifices 52–56 such as, for example, a solvent, without departing from the scope of the invention.

The auger 36 is mounted on a carriage assembly 58 having a forward bulkhead 60, a rear wall 62 and longitudinal struts 64, 66, 68, 70 (see also FIG. 1). The struts 64–70 each comprise a length of angle and extend between the bulkhead 60 and rear wall 62 to form a box shape.

Figure 4:
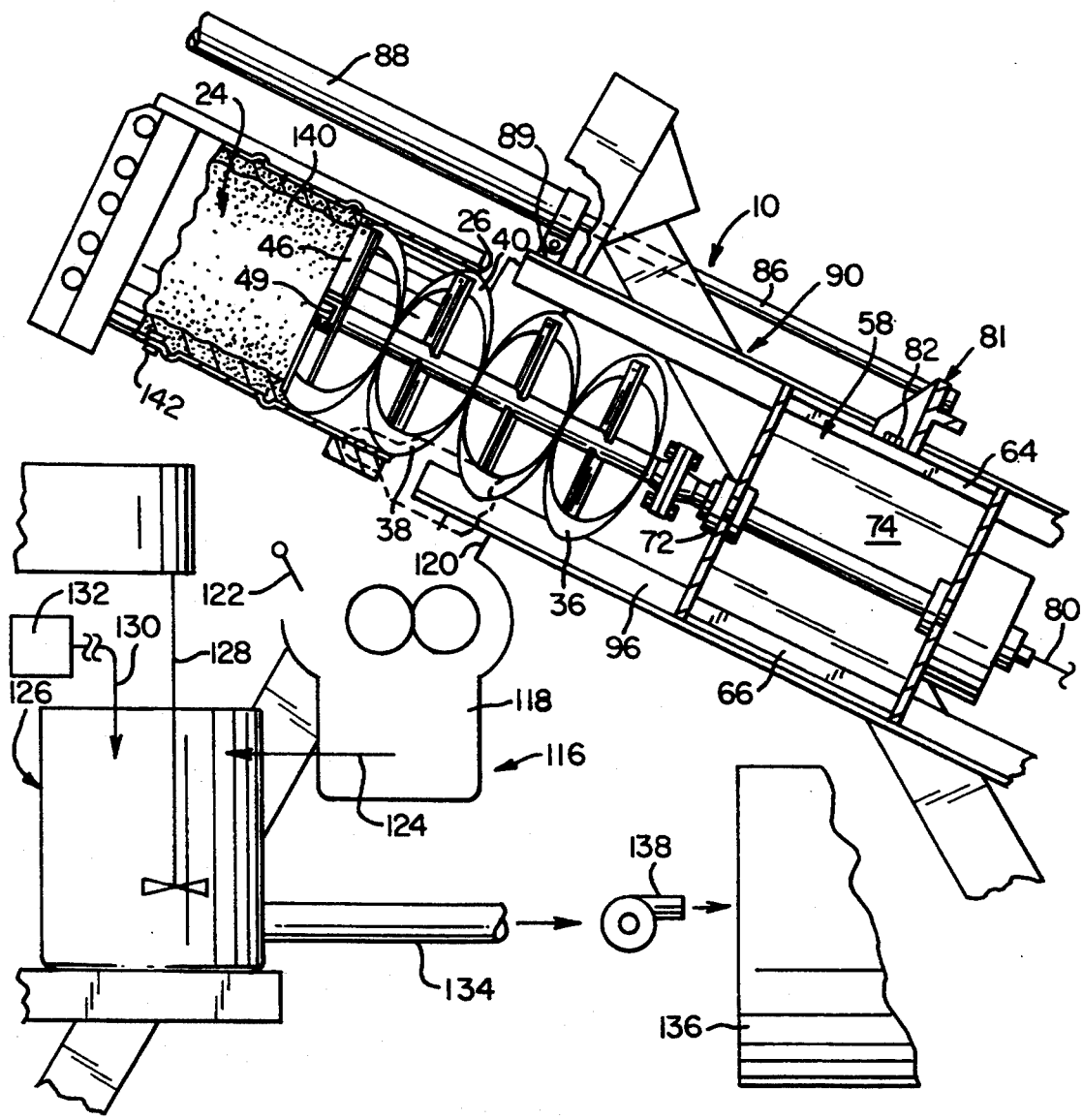
FIG. 4 is a detail of the apparatus of FIG. 1 showing additional material treatment components used in combination with the auger assembly.

The bulkhead 60 includes a thrust bearing 72 which supports the shaft 42 and provides a fluid-tight seal. As shown in FIG. 4, the sides of the carriage assembly 58 are covered by sheet steel panels 74 (only panel 74 extending between struts 64, 66 is shown in FIG. 4, it being understood that a similar panel extends between struts 68, 70).

The rear wall 62 supports a motor 76 which rotates the shaft 42 and auger 36, and is connected to the shaft 42 by a drive shaft 78, which passes through the bearing 72. Preferably, the motor 76 is a hydraulic motor; however, other types of motors such as an electric motor may be used without departing from the scope of the invention. The drive shaft 78 is hollow and is connected to a supply line 80 which, in turn, is supplied with steam from steam source 51. Consequently, steam from source 51 is conveyed through line 80, drive shaft 78, central shaft 42 to exit orifices 52, 54, 56 in the cross bar 46 (see FIG. 3).

A cylinder rod mounting bar 81 is mounted on the struts 64, 68 by bolts 82. The cross strut 81 receives and is attached to the rods 84, 86 of cylinders 88 (only one of which is shown in FIGS. 1 and 4). The cylinders 88 are mounted on the support frame 16 by double pivots 89 to allow sideways or vertical pivoting motion of the cylinders, thereby allowing the auger 36 to circumvent an obstacle such as a side bung in a barrel.

The carriage assembly 58 is slidably mounted within a track 90, which includes elongate guide rails 92, 94, 96, 98, each comprised of a length of angle. The guide rails 92–98 are mounted on the support frame 16, and upper guide rails 92, 94 support cylinders 88. As shown in FIG. 3, the guide rails 92–98 constrain the movement of the carriage assembly 58 to rectilinear motion in response to actuation of the cylinders 88. As shown in FIG. 2, the autoauger 10 includes a programmable logic controller ("PLC") 100 which is connected by cables 102 to the motor 76 and by cables 104, 106, 108 to limit switches 110, 112 and 114, respectively, all mounted along rail 92. PLC 100 actuates the cylinders 88 through a solenoid operated valve (not shown) and actuates motor 76, thereby controlling the rotational speed of the auger 36 and the positioning of the auger and carriage assembly 58 along the track 90. The limit switches 110–114 define forward and rearward limits of travel of the carriage assembly 58, and consequently the auger 36.

As shown in FIG. 4, the autoauger 10 includes a material conveying system, generally designated 116. The conveying system 116 includes a motor-driven shear shredder 118 which is positioned directly beneath the auger assembly and includes a hopper 120 to collect material removed from the barrel 24. Although many types of shear shredders may be employed, in a preferred embodiment, a model 30000 Series Muffin Monster, manufactured by Chambers Environmental International, is employed. The hopper 120 includes a pivoting door 122 which can control the size and flow rate of material entering the shear shredder 118.

The shear shredder 118 is connected by a conduit 124 to a mixing tank, generally designated 126. The mixing tank 126 includes a mixer 128 and a diluent supply line 130 which is connected to a source of diluent 132 such as a petroleum-based solvent. The mixing tank may be a Systank brand mixing tank manufactured by Systech Environmental Corporation. The mixing tank 126 includes a conduit 134 which is connected to a rotary reactor 136 such as an incinerator or cement kiln. Conduit 134 includes an in-line pump 138 to convey the material from the mixing tank 126 to the reactor 136.

The operation of the system is as follows: 55 gallon drums 24 of highly viscous hazardous or toxic material are unloaded from trucks onto conveyor 18 and transported to the conveyor 30 which is part of the barrel platform 20. Actuator 22 pivots the platform 20 to the position shown in FIG. 1, wherein the barrel 24 is substantially inverted such that its open end 26 is oriented substantially downwardly, exposing the contents of the barrel 24 to the auger assembly 14. The barrel 24 preferably is oriented such that it is aligned along its central axis with the central axis of the central shaft 42. The PLC 190 actuates the motor 76 which rotates the auger 36. The PLC then actuates cylinders 88 (see FIG. 4) which retract the rods 84, 86 to move the carriage assembly 58 and auger 36 forwardly so that the auger 36 enters through the open end 26 of the barrel 24.

The ribbons 38, 40 of the auger 36 bite into the material 140 within the barrel 24 and urge it rearwardly, both spirally along the ribbons 38, 40 and parallel to the shaft 42, out of the open end 26 of the barrel. The cross bars 46, 49 are the leading edges of the auger 36 and break up the material across the entire diameter of the barrel 24, and the teeth 48, 50 (see FIG. 3) assist the cross bars 46, 49 in performing this task. As the auger 36 progresses into the drum 24, steam from source 51 traveling through line 80 is injected into the barrel through orifices 52, 54, 56 which helps loosen and break up the material within the drum. If the barrel 24 includes a sideward projection such as a side bung 142 (see FIG. 4), the tolerances between the frame 58 and rails 92-98 are such that the auger 36 is permitted to skew slightly from the centerline of travel such that the auger negotiates around the projection 142.

Material 140 removed from the barrel 24 falls downwardly through the hopper 122 and is shredded in shredder 118. The shredded material is conveyed through conduit 124 to the mixing tank 126 where diluent is added from source 132, if necessary. The mixture is blended by mixer 128 and conveyed through conduit 134 by pump 138 to be burned in reactor 136.

Once the auger 36 has progressed the entire length of the barrel 24, at which time the frame 58 reaches limit switch 110, the PLC reverses the cylinders 88 to retract the frame 58 and auger 36 from the barrel 24. When the auger 36 is completely removed from the barrel 24, the rotary actuator 22 pivots the barrel platform 20 to an upright position, shown in phantom in FIG. 1, at which time the barrel 24 can be removed from the drum dumper 12 by way of conveyor 18.

Consequently, the scraper 10 provides a highly automated mechanism for removing the highly viscous contents of a 55 gallon drum, thereby eliminating many of the manual steps of chipping out such material associated with prior art methods. After removal of the contents 140 by the auger 36, a relatively thin layer of material may remain in the drum, but such a relatively small quantity of material can be removed easily by steam cleaning or use of other solvents.

While the form of apparatus herein described constitutes a preferred embodiment of this invention, it is to be understood that the invention is not limited to this precise form of apparatus, and that changes may be made therein without departing from the scope of the invention.

What is claimed is:

1. An apparatus for removing viscous material from a barrel comprising:

means for substantially inverting said barrel such that an open end thereof is oriented generally downwardly;

means forming an auger shaped to enter said open end of said barrel and including a double helical ribbon having an outside diameter substantially equal to an inside diameter of said barrel;

means for delivering a fluid to an area immediately adjacent to said auger and to an area adjacent leading edges of said ribbon where said auger first contacts said viscous material;

motor means for rotating said auger at a predetermined speed; and carriage means for mounting said auger for rotational movement by said motor means, for reciprocal movement into and out of said barrel through said open end, and for allowing said auger lateral displacement sufficient to negotiate around an immovable obstruction located at any point about an inner periphery of said barrel;

a frame on said carriage means for supporting said auger and said motor means;

guide means for supporting said frame for reciprocal movement toward and away from said barrel, said guide means including a plurality of rail means for constraining movement of said frame in a substantially rectilinear direction toward and away from said barrel;

means for moving said frame along said guide means, whereby said auger is urged into said barrel;

whereby said auger is rotated by said motor means and urged through said open end such that said auger moves through said viscous material in said barrel and urges said material out of said barrel through said open end; and means for conveying said material removed from said barrel to a reactor means for burning of said material.

2. The apparatus of claim 1 wherein said frame includes a bulkhead; a main bearing mounted on said bulkhead for supporting said auger; a rear wall for supporting said motor means; and strut means extending between said bulkhead and said rear wall.

3. The apparatus of claim 2 wherein said frame is sized such that said frame and auger skew when said auger comes into contact with a bung on a side of said barrel, whereby said auger, when rotated by said motor means, is able to progress past said bung to scrape an entire inner side wall of said barrel.

4. The apparatus of claim 3 wherein said moving means includes a pair of cylinders mounted on said guide means and connected to said frame, whereby actuation of said cylinders causes said frame to move along said rail means.

5. The apparatus of claim 4 wherein said frame includes a cross strut, positioned above said rail means and shaped to receive ends of rods of said cylinders.

6. The apparatus of claim 5 wherein said auger includes a central shaft supporting said ribbon and mounted on said carriage means.

7. The apparatus of claim 6 wherein said fluid is steam.

8. The apparatus of claim 7 wherein said auger includes cross bar means mounted on an end of said central shaft and interconnecting outer ends of said double helical ribbon; and means forming teeth projecting outwardly from said cross bar for scraping said material in said barrel as said auger passes through said open end.

9. The apparatus of claim 8 wherein said cross bar means includes first and second cross bars oriented perpendicular to each other.

10. The apparatus of claim 9 further comprising means for grinding said material removed from said barrel by said auger.

11. The apparatus of claim 10 wherein said grinding means includes a hopper positioned to receive said material removed through said open end.

12. The apparatus of claim 11 further comprising holding tank means for receiving said material from said grinding means.

13. The apparatus of claim 12 wherein said holding means includes a tank; means for adding a diluent to said tank; and means for agitating contents of said tank.

14. The apparatus of claim 13 wherein said means for conveying conveys said contents of said tank to reactor means for burning of said contents.

15. The apparatus of claim 14 further comprising control means for actuating said motor means and said carriage means.

16. The apparatus of claim 15 wherein said control means includes a programmable logic controller; and a plurality of limit switches, positioned on said carriage means corresponding to forward and rearward limits of travel of said auger means.

* * * * *